United States Patent [19]  [11] 3,954,924
Castro et al.  [45] May 4, 1976

[54] METHOD FOR SIMULTANEOUSLY CASTING SHEETS ON BLOCKS OF CELLULAR POLYMERIC MATERIAL

[75] Inventors: Roger Albert Castro, New Barnet; Richard John Orman, Welwyn Garden City; James Ernest Ryan, Knebworth, all of England

[73] Assignee: Imperial Chemical Industries Limited, London, England

[22] Filed: May 31, 1973

[21] Appl. No.: 365,558

[30] Foreign Application Priority Data
June 8, 1972 United Kingdom............... 26802/72

[52] U.S. Cl.................................. 264/41; 249/134; 260/2.5 L; 260/29.6 WQ; 264/236; 264/DIG. 14

[51] Int. Cl.²........................................ B29D 27/04
[58] Field of Search.............. 264/41, 236, DIG. 14; 260/2.5 L, 29.6 WQ; 249/134

[56] References Cited
UNITED STATES PATENTS

| | | | |
|---|---|---|---|
| 3,442,991 | 5/1969 | Lanz | 249/176 X |
| 3,551,541 | 12/1970 | Rossetti | 249/134 X |
| 3,802,949 | 4/1974 | Brown et al. | 161/160 |

*Primary Examiner*—Philip Anderson
*Attorney, Agent, or Firm*—Cushman, Darby & Cushman

[57] ABSTRACT

Sheets of cellular polymeric material are cast from a water-in-oil emulsion in a mould subdivided by one or more partitions.

3 Claims, No Drawings

METHOD FOR SIMULTANEOUSLY CASTING SHEETS ON BLOCKS OF CELLULAR POLYMERIC MATERIAL

The invention relates to a method for the production of sheets of cellular polymeric material, and in particular to a method of casting the sheets which is readily suited to commercial production of large numbers of such sheets.

According to the invention we provide a method for the simultaneous casting of a plurality of sheets or blocks of cellular polymeric material, the method including emulsifying in a continuous phase comprising an oil having a polymerisable constituent, sufficient of an aqueous disperse phase to enable the temperature during polymerisation of said constituent to be maintained below the boiling point of the lowest boiling fraction in the emulsion, pouring the emulsion into a mould subdivided by one or more partitions before, during or after receiving the emulsion, and effecting polymerisation of said constituent.

The mould is preferably subdivided by inserting the partitions into the mould after the mould has received the emulsion. The surfaces of the resultant sheets or blocks which are then cast against the partitions appear to be generally less friable than when when the partition is inserted before the emulsion. Moreover insertion of the partitions into the emulsion-filled mould enables the emulsion conveniently to be formed in the mould a suitable-sized poppy head dispersator being convenient for applying shear to the oil and water mixture.

For any given polymerisable constituent, the rate of polymerisation is dependent on the temperatures used and on the composition e.g. catalysts and accelerators (if any) selected, in a manner similar to the bulk polymerisations referred to above. However, because the aqueous disperse phase acts as a heat sink the ability to control the reation may be made largely independent of the rate reaction. Indeed, a particularly economical method of polymerisation is to use a mould which is lagged against heat loss, even when providing elevated initiation temperatures by using warm water for the emulsion, thereby avoiding the necessity of providing ovens in which to carry out the polymerisation. However, the heat of the exothermal polymerisation reaction is still produced, and accordingly it is still necessary to balance the initial temperature used and the quantity of water employed.

When using methyl methacrylate monomer as the polymerisable constituent of the emulsion, we found that we required at least 70% of water for a lagged system. However, for consistent results, we prefer to use at least 75% of water, where the water content is quoted in each case as the percentage by weight of the total emulsion. Quantities of water as low as 75 weight percent have also been satisfactorily used in methyl methacrylate emulsions whose initial temperature has been as high as 45°C, even when using a lagged mould. For elevated initial temperatures, however, larger proportions of water are preferred. It will be realised that other polymerisable constituents having a similar heat of polymerisation to methyl methacrylate, will require similar quantities of water; but for other monomers and comonomers having different heats of reaction, the minimum safe proportion of water will vary accordingly and this proportion can be readily determined by simple experiment. Where there is heat loss from the emulsion during the polymerisation, correspondingly lower amounts of water are needed. Our preferred polymerisable constituent is methyl methacrylate because of the ease with which the dispersed water may subsequently be removed, and we prefer to use emulsions having oil phases of which at least 80 percent by weight is methyl methacrylate.

The invention is useful for the simultaneous production of large numbers of sheets and blocks with the minimum of equipment, especially for the commercial batch production of thick sheets, suitable for forming doors and the like.

The invention is illustrated by the following Examples.

EXAMPLE 1

Four thick cellular sheets were prepared by curing a methyl methacrylate-based emulsion in a mould.

The mould consisted of an open-topped wooden box having an approximately 1 m square cross-section, and 1 m square panels of window glass which could be inserted into the box to divide its volume transversely into a series of parallel chambers, similarly approximately 1 m square and having the thickness desired for the sheets. The sides of the box were provided with vertical guiding channels for supporting the panels and down which the panels could be slid into position through the open top of the box.

An emulsion was prepared in the box. The continuous oil phase was placed in the box first, and consisted of 2 percent by weight of "Atlac" 382 E (a propoxylated bisphenol A fumarate (1:1) polyester, marketed by Honeywill-Atlas Limited, and having an acid number of 12), 2 percent by weight of triethanolamine, 2 percent by weight of benzoyl peroxide (added as 4 percent of a 50 percent solution), 10 percent by weight of a low molecular weight polymethyl methacrylate ('Diakon'MG 101) and methyl methacrylate up to the total 100 weight percent. Water was then added at the rate of 6 l min$^{-1}$ with continuous stirring using an 8 cm diameter poppy head dispersator rotating at 1000 rpm, to produce a stable emulsion containing 75 percent by weight of water as the disperse phase, the remainder being the above oil phase, and 0.8 percent by weight of dimethyl-p-toluidine then mixed in.

Five glass panels were inserted into the mould to divide it into four parallel chambers approximately 6 cm wide with two further chambers of about 1 cm width, one at each end of the box. The box was then covered and left for about 45 min, after which time the methyl methacrylate had cured. The sheets were later removed from the box, and the two thinner outer sheets were discarded, having been provided so that the emulsion from which they were formed would balance the hydrostatic pressure in the thicker chambers and stop bowing of the thicker sheets. The thicker sheets were dried in a hot air oven for an initial period of 1 day during which time the temperature was kept below 100°C as the bulk of the water was driven off. The temperature was then increased to 110°C for a further 10 days leaving an air-filled cellular structure. On cutting the sheets along various sections (including through the centre of the sheet), the structure appeared to be uniform, having a very fine cell size. No larger cells were found, the presence of which might have suggested the onset of boiling. The surfaces of the sheets were smooth and glossy, with no evidence of contraction marks or any other imperfections which might be caused by shrinkage during polymerisation.

EXAMPLE 2

A stack of thinner sheets was cast using the same composition as for Example 1. The mould was also a box similar to that of Example 1 except that nine panels were inserted into the mould approximately 13 mm apart in a parallel array to provide ten chambers approximately 1 m × 1 m × 13 mm. The emulsion was then left to cure as before.

The resultant sheets required more care in removing them from the mould to prevent their fracture, but the cellular structure was again uniformly fine, having essentially the same appearance as that produced in Example 1.

EXAMPLE 3

A stack of four thick sheets (with a further thin sheet at each end of the stack) was prepared using the mould of Example 1, but using a hot-setting recipe. The continuous oil phase consisted of 2 percent by weight of "Atlac" 382 E, 0.12 percent by weight of sodium hydroxide, 0.3 percent by weight of 2,4-dichlorobenzoyl peroxide, 10 percent by weight of 2-ethyl hexyl acrylate, and the balance to 100 weight percent of methyl methacrylate. The oil was emulsified in the mould with warm water at 45°C to give an emulsion containing 15 percent by weight of water as the disperse phase. The water added initially contained 10 percent by weight of sodium hydroxide, and sufficient of this solution was added to bring the total quantity of sodium hydroxide up to 0.12 percent by weight of the methyl methacrylate, after which, water free from added sodium hydroxide was added to complete the required quantity for the disperse phase. The dividing panels were then inserted into the mould, and the filled mould placed in an oven at 55°C to cure. The emulsion had solidified after 3-4 hours, but the mould was then left in the oven overnight to remove residual uncured monomer.

The sheets were removed from the mould and dried at 95°C for 24 hours followed by 115°C for a further 8 days. Sections through the resultant sheets again showed the cell structure to be fine and uniform throughout the sheet.

EXAMPLE 4

Example 3 was repeated with the exception that the mould was well lagged, and no oven was used. The lagged mould containing the emulsion at an initial temperature of about 45°C, was left undisturbed overnight, for a total period of about 18 hours. The sheets were then removed from the mould, dried using the same cycle as used in Example 3, and their structure examined. The structure was again uniform, and no difference from that produced in Example 3, could be seen. The fine and uniform cell structure obtained in this and the previous Example, showed that no boiling of any constituent had occured. Because of the considerably exothermal heat produced in the polymerisation of methyl methacrylate, we found this freedom from boiling to be particularly surprising with the initial elevated temperatures used in these two Examples, especially in view of the low boiling point (82°C of the methyl methacrylate/water azeotrope formed.

EXAMPLE 5

Four thick cellular sheets were prepared by the method, and using the mould, of Example, 1, but using a comonomer and also a different emulsifier.

The continuous oil phase of the emulsion consisted of 2 percent by weight of ethyl cellulose, 10 percent by weight of 2-ethyl hexyl acrylate, 2 percent by weight of benzoyl peroxide and 10 percent by weight of a low molecular weight polymethyl methacrylate ('Diakon' MG 101), the balance to 100 percent being methyl methacrylate in which the other components were dissolved. The ethyl cellulose used was a commercially available grade, N 10, marketed by Hercules Powder Company Limited, having an ethoxyl content specified as falling within the range 47.5 –49.0 percent by weight, and having a viscosity at 25°C within the range 8 – 11cP for a 5 percent solution in 80:20 toluene:ethanol of a sample dried 30 min. at 100°C. 75 parts by weight of water, and 25 parts by weight of a solution in methyl methacrylate, were passed through an emulsifying machine wherein shear was applied to the mixture to form an emulsion in which the water formed the disperse phase. As the monomer entered the machine, 1 percent by weight of dimethyl-p-toluidine was injected by small metering pumps.

On leaving the emulsifying machine, the emulsion was immediately poured into the mould of Example 1, and when the mould was filled, the glass panels were inserted as before, and the mould left for about 30 min. to cure without heat being supplied. The ambient temperature was about 20°C. After curing, the sheets were removed and dried under the same conditions as those produced in Example 1.

The results were very similar to those obtained in Example 1, the surfaces of the sheets again being smooth and glossy, and the structure appearing to be uniform with a very fine cell size.

We claim:

1. A method for the simultaneous casting of a plurality of sheets or blocks of cellular polymeric material, comprising forming an emulsion having an aqueous disperse phase and a continuous phase comprising a polymerizable liquid consisting of 80 to 100 percent by weight of methyl methacrylate and 20 to 0 percent by weight of a liquid miscible and copolymerizable with the methyl methacrylate, and polymerizing said polymerizable liquid in a mold having one or more removable partitions which subdivide the emulsion during polymerization into the shapes of said sheets or blocks, the mold being thermally lagged against heat loss and the aqueous phase constituting at least 70 percent water by weight of the emulsion whereby heat evolved during polymerization is absorbed by the disperse phase and the temperature of the emulsion maintained below the boiling point of the lowest boiling fraction of said emulsion.

2. A method according to claim 1 in which the mould is sub-divided by inserting the partitions into the mould after the mould has received the emulsion.

3. A method according to claim 2 which comprises adding separately to the mould the constituents of the continuous phase and the aqueous disperse phase respectively, and emulsifying the two phases in the mould.

* * * * *